Jan. 23, 1934.   G. ORNSTEIN   1,944,804
METHOD AND DEVICE FOR PURIFYING AQUEOUS
LIQUIDS BY TREATMENT WITH CHLORINE
Filed Jan. 13, 1933
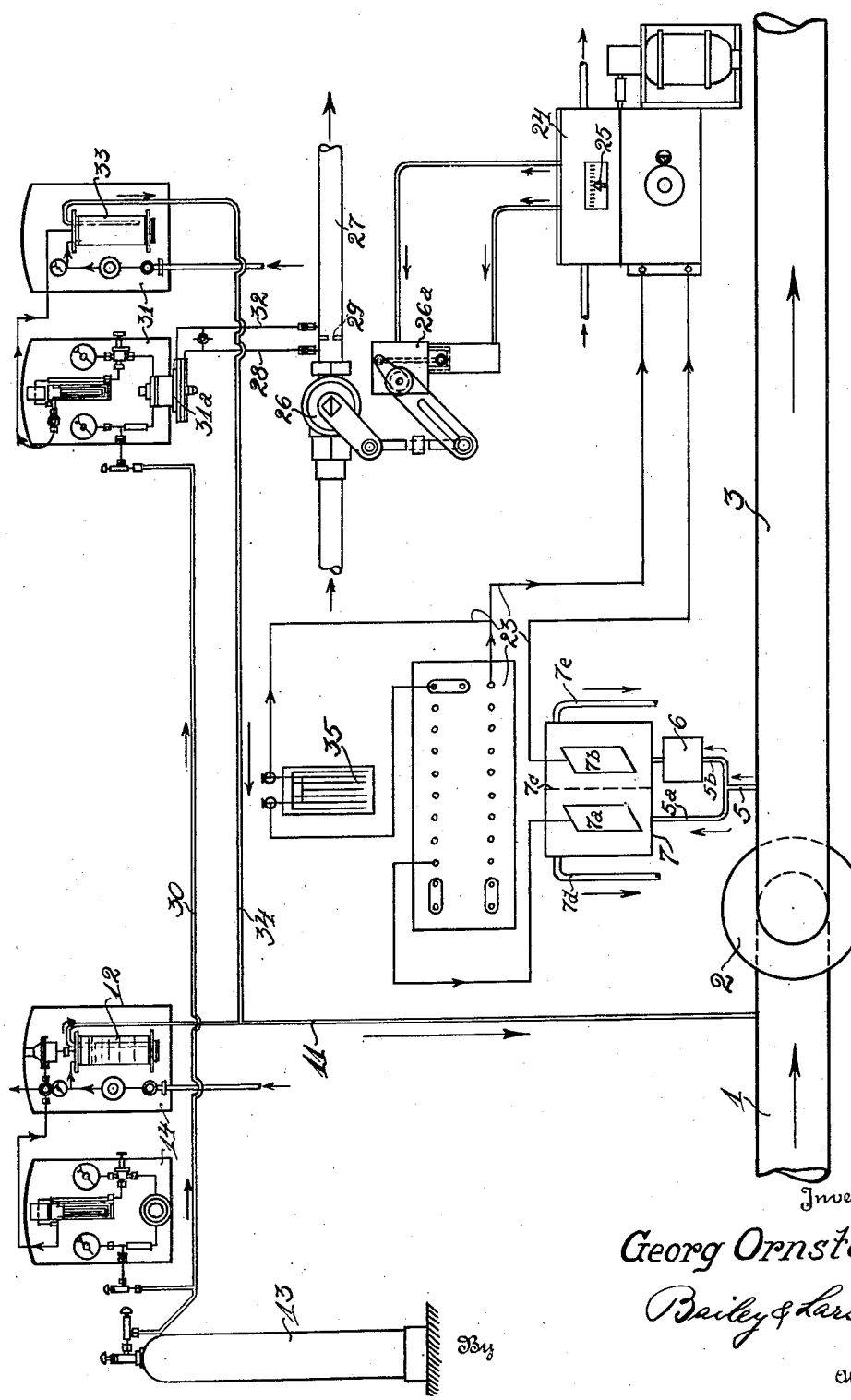
Inventor
Georg Ornstein
Bailey & Larson
Attorney Patented Jan. 23, 1934

1,944,804

UNITED STATES PATENT OFFICE 1,944,804

METHOD AND DEVICE FOR PURIFYING AQUEOUS LIQUIDS BY TREATMENT WITH CHLORINE

Georg Ornstein, Berlin, Germany

Application January 13, 1933, Serial No. 651,613, and in Germany January 13, 1932

8 Claims. (Cl. 210—28)

This invention relates to the treatment of aqueous liquids, such as water or sewage with chlorine.

In my copending application Ser. No. 491,585 of October 27, 1930, I have described a method and device for treating flowing water or sewage with an excess of chlorine, in which the difference of potential produced across two electrodes of a galvanic element, of which one is in contact with a stream of the flowing water or sewage after addition of the chlorine and the other with a stream of the flowing water or sewage before addition of the chlorine, is used for indicating the degree of chlorination of the water or sewage under treatment and for regulating the addition of chlorine according to this indication either by hand or automatically. In the latter case it is preferred to use the difference of potential produced across the electrodes directly for controlling the regulating means for the addition of the chlorine to the flowing water or sewage.

It is the main object of the present invention to make the method and device of the above mentioned prior application simpler and more exact, by introducing a dechlorination step for a small part of the liquid treated with chlorine, which enables the indication and control of the chlorine content of the aqueous liquid under treatment to be effected by a single stream of chlorinated water, tapped off from the main stream.

The annexed drawing shows schematically by way of example a device for carrying out the invention and according to the invention.

The water or sewage to be purified flows through a tube 1 which is connected by a pump 2 with a tube 3 delivering the water or sewage. From tube 11 an excess of chlorine is added to the water or sewage flowing through tube 1. A tube 5 is used for tapping off a side stream of water or sewage containing chlorine from the main stream flowing through the delivery tube 3. The side stream flowing through the tube 5 is subdivided into two streams, of which one is led by tube 5a to a compartment of a galvanic cell 7 containing the electrode 7a separated from the electrode 7b by a porous wall 7c. The water or sewage passes said compartment in contact with said electrode 7a and leaves the compartment by an overflow 7d. The other stream obtained by subdivision of the side stream passing tube 5 is led by tube 5b to a dechlorination filter 6 containing active charcoal or zeolite or other dechlorinating agents. The dechlorinated water or sewage leaving said filter 6 enters the other compartment of the galvanic cell 7 containing the electrode 7b and leaves said compartment by the overflow 7e.

There is produced a difference of potential across the electrodes 7a and 7b which is employed in the same manner as described in my above mentioned prior application for indicating and regulating the chlorine content of the water or sewage under treatment.

The chlorine which is fed to the water or sewage under treatment is supplied from cylinder 13 through dosing apparatus 14 into the pipe line 1. The two electrodes 7a and 7b are connected with a Wheatstone bridge circuit 23 containing a galvanometer 24. The needle 25 of the galvanometer operates a regulating piston 26a of a control valve 26 which serves to regulate an auxiliary supply of water flowing through the pipe line 27. A difference of pressure is produced by this auxiliary water current at choking disc 29. This pressure difference functioning along the pipe lines 28 and 32 regulates the control valve 31a of chlorine dosing plant 31. The details of this chlorine dosing plant 31 which is of the usual construction have been omitted for reasons of simplicity.

A chlorine water solution is produced in container 33, the dosage of which solution depends on the position of the galvanometer needle and is controlled by dosing apparatus 31, and the solution is then introduced by means of pipe line 34 into the pipe line 11 which also introduces the chlorine water from the container 12 of dosing apparatus 14 into the main conduit 1.

The main quantity of chlorine necessary for the treatment of water or sewage flowing in pipe line 1 is constantly introduced, while only the peak requirement is regulated in accordance with my invention. Since the throw of galvanometer needle 25 is constantly dependent on the amount of chlorine contained in the treated water, the peak of the added chlorine is constantly regulated in accordance with the position of the needle, i. e. according to the voltage produced between electrodes 7a and 7b.

The needle movement of a delicate galvanometer is quite sufficient to effect the desired regulation. Those portions of the device as illustrated in the drawing and described herein which have to do with the admission of the main supply of chlorine from container 12 and the regulation of the admission of the peak chlorine supply by means of galvanometer needle 25 have been previously described in my copending application S. N. 491,585 filed on or about October 27, 1930.

By chlorine I understand any form of active chlorine for the purification of water or sewage such as gaseous and liquid chlorine, aqueous solutions of chlorine, sodium and calcium hypochlorite solution and the like.

The foregoing detailed description has been given for clearness of understanding only, and no unnecessary limitations should be understood therefrom, but the appended claims should be construed as broadly as permissible in view of the prior art.

I claim:

1. A process for purifying aqueous liquids by treatment with chlorine, which consists in adding an excess of chlorine to a flowing stream of the aqueous liquid to be treated, contacting a stream of the liquid containing the chlorine with one electrode of a galvanic element, dechlorinating another stream of the liquid containing the chlorine and contacting it after dechlorination with the other electrode of a galvanic element and regulating the addition of chlorine to the flowing stream of liquid according to the difference of potential produced across said electrodes.

2. A process for purifying aqueous liquids by treatment with chlorine, which consists in adding an excess of chlorine to a flowing stream of the aqueous liquid to be treated contacting a stream of the liquid containing the chlorine with one electrode of a galvanic element, dechlorinating another stream of the liquid containing the chlorine by treatment with active charcoal and contacting it after dechlorination with the other electrode of a galvanic element and regulating the addition of chlorine to the flowing stream of liquid according to the difference of potential produced across said electrodes.

3. A process for purifying aqueous liquids by treatment with chlorine, which consists in adding an excess of chlorine to a flowing stream of the aqueous liquid to be treated contacting a stream of the liquid containing the chlorine with one electrode of a galvanic element, dechlorinating another stream of the liquid containing the chlorine and contacting it after dechlorination with the other electrode of a galvanic element and controlling a regulator for the addition of chlorine to the flowing stream of liquid by the difference of potential produced across said electrodes.

4. A process for purifying aqueous liquids by treatment with chlorine which consists in adding an excess of chlorine to a flowing stream of the aqueous liquid to be treated, tapping of a flowing side stream of said liquid containing chlorine, subdividing said flowing stream into two flowing streams, contacting one of said flowing streams obtained by subdivision with one electrode of a galvanic element, dechlorinating said other flowing stream obtained by subdivision, contacting said dechlorinated flowing stream with the other electrode of said galvanic element and regulating the addition of chlorine to the flowing stream of liquid according to the difference of potential produced across said electrodes.

5. A device for purifying aqueous liquids by treatment with chlorine comprising means for adding chlorine to a flowing stream of the aqueous liquid to be treated, means for contacting one electrode of a galvanic element with a flowing stream of the liquid containing chlorine, means for dechlorinating another flowing stream of the liquid containing chlorine, means for contacting said dechlorinated flowing stream of the liquid with the other electrode of the galvanic element and means for indicating the difference of potential produced across said electrodes.

6. A device for purifying aqueous liquids by treatment with chlorine comprising means for adding chlorine to a flowing stream of the aqueous liquid to be treated, means for contacting one electrode of a galvanic element with a flowing stream of the liquid containing chlorine, means for dechlorinating another flowing stream of the liquid containing chlorine, means for contacting said dechlorinated flowing stream of the liquid with the other electrode of the galvanic element and means for controlling said means for adding chlorine by the difference of potential produced across said electrodes.

7. A device for purifying aqueous liquids by treatment with chlorine comprising means for adding chlorine to a flowing stream of the aqueous liquid to be treated, means for contacting one electrode of a galvanic element with a flowing stream of the liquid containing chlorine, means for passing another flowing stream of the liquid containing chlorine through a layer of active charcoal for dechlorination purposes, means for contacting said dechlorinated flowing stream of the liquid with the other electrode of the galvanic element and means for indicating the difference of potential produced across said electrodes.

8. A device for purifying aqueous liquids by treatment with chlorine comprising means for adding chlorine to a flowing stream of the aqueous liquid to be treated, means for tapping off a flowing stream of liquid containing chlorine from said flowing stream of aqueous liquid under treatment, means for subdividing said flowing stream of liquid tapped off, into two flowing streams, means for contacting one of said flowing streams obtained by subdivision with one electrode of a galvanic element, means for dechlorinating said other flowing stream obtained by subdivision, means for contacting said dechlorinating stream with the other electrode of a galvanic element and means for regulating the addition of chlorine to said flowing liquid under treatment according to the difference of potential produced across said electrodes.

GEORG ORNSTEIN.